(12) United States Patent
Chung et al.

(10) Patent No.: US 9,262,098 B2
(45) Date of Patent: Feb. 16, 2016

(54) PIPELINED DATA I/O CONTROLLER AND SYSTEM FOR SEMICONDUCTOR MEMORY

(71) Applicants: SK Hynix Inc., Icheon (KR); Industry-Academic Cooperation Foundation, Yonsei University, Seoul (KR)

(72) Inventors: Eui-Young Chung, Seongnam (KR); Sang-Hoon Park, Goyang (KR)

(73) Assignees: SK HYNIX INC., Icheon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 293 days.

(21) Appl. No.: 13/753,447

(22) Filed: Jan. 29, 2013

(65) Prior Publication Data

US 2013/0205074 A1    Aug. 8, 2013

(30) Foreign Application Priority Data

Feb. 2, 2012   (KR) .......................... 10-2012-0010595

(51) Int. Cl.
   *G06F 12/02*    (2006.01)
   *G06F 3/06*     (2006.01)
   *G06F 13/12*    (2006.01)

(52) U.S. Cl.
   CPC .............. *G06F 3/0679* (2013.01); *G06F 3/061* (2013.01); *G06F 3/0656* (2013.01); *G06F 3/0659* (2013.01); *G06F 12/0246* (2013.01); *G06F 13/126* (2013.01)

(58) Field of Classification Search
   CPC ............ G06F 12/0238; G06F 12/0246; G06F 12/0866; G06F 12/0868; G06F 12/0871; G06F 12/0875; G06F 13/12; G06F 13/126; G06F 2212/214
   See application file for complete search history.

(56) References Cited

U.S. PATENT DOCUMENTS

| | | | |
|---|---|---|---|
| 7,017,022 B2* | 3/2006 | Jeddeloh | 711/169 |
| 2009/0168525 A1* | 7/2009 | Olbrich et al. | 365/185.11 |
| 2012/0079174 A1* | 3/2012 | Nellans | G06F 12/0246 711/103 |
| 2012/0239854 A1* | 9/2012 | Hsueh et al. | 711/103 |
| 2012/0317365 A1* | 12/2012 | Elhamias | 711/141 |
| 2012/0331222 A1* | 12/2012 | Jibbe et al. | 711/114 |

FOREIGN PATENT DOCUMENTS

KR    10-2011-0004651 A    1/2011

\* cited by examiner

*Primary Examiner* — Hal Schnee

(57) ABSTRACT

A controller controls data input/output for a semiconductor memory device. The controller includes a first buffer configured to perform data transmission between an interface and the semiconductor memory device, a first control unit configured to control the semiconductor memory device according to an external request, and a second control unit configured to control the first buffer and the first control unit to simultaneously process a plurality of external requests according to a pipeline scheme.

11 Claims, 18 Drawing Sheets

FIG. 2

| Reserved | Entry Index | STAGE | RW/Valid/Complete /Reserved |
|---|---|---|---|
| Reserved | | | |
| Reserved | | | |
| Requested Address | | | |

FIG. 6

| Reserved | Entry Index | STAGE | RW/Valid/Complete/Hit |
|---|---|---|---|
| | Cache Address | | |
| | Evicted Cache Address | | |
| | Requested Address | | |

31 ... 0

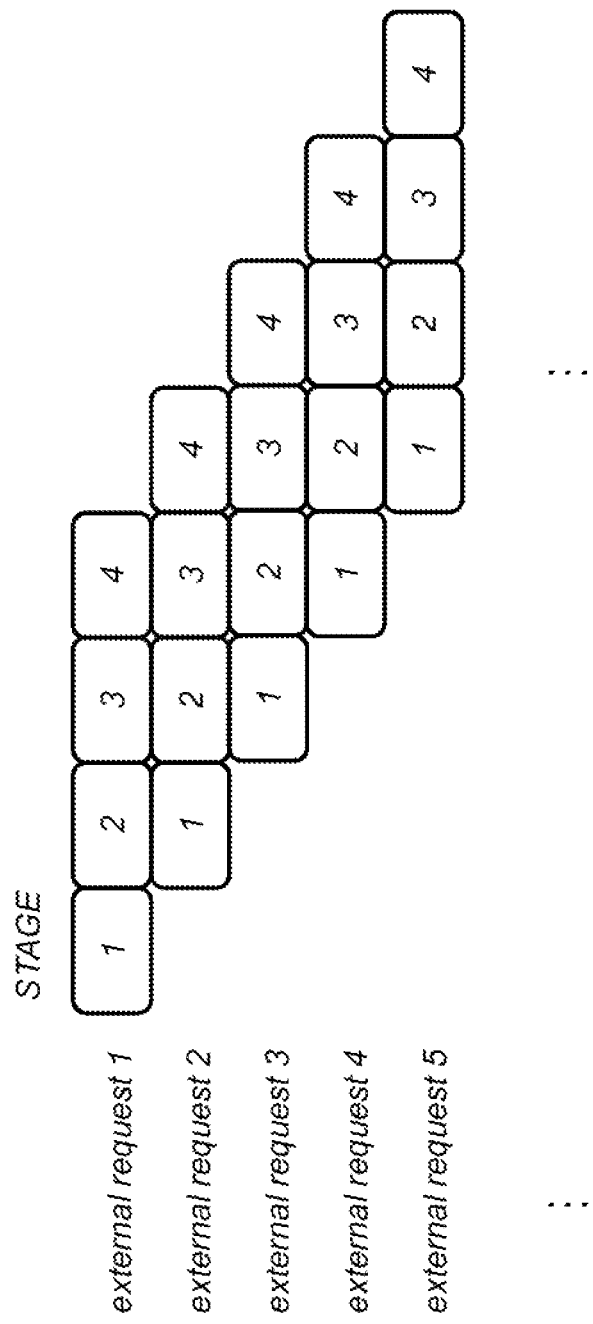

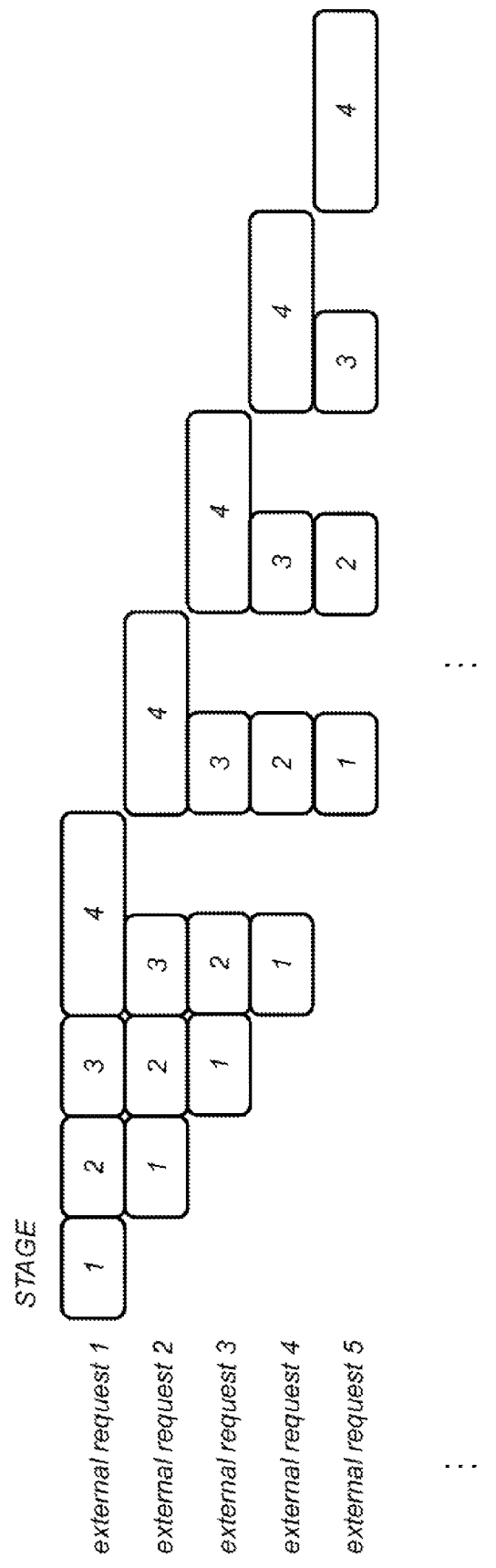

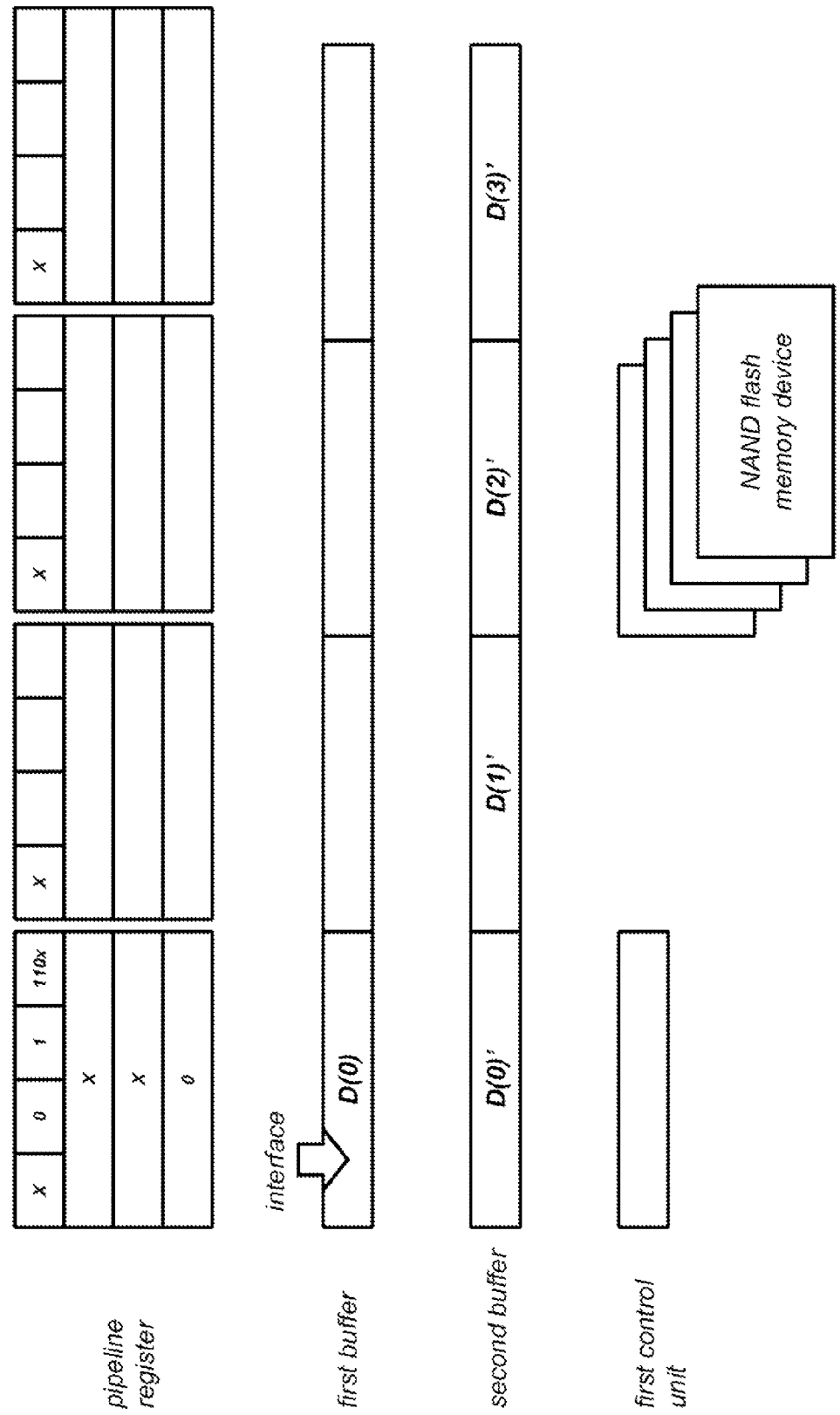

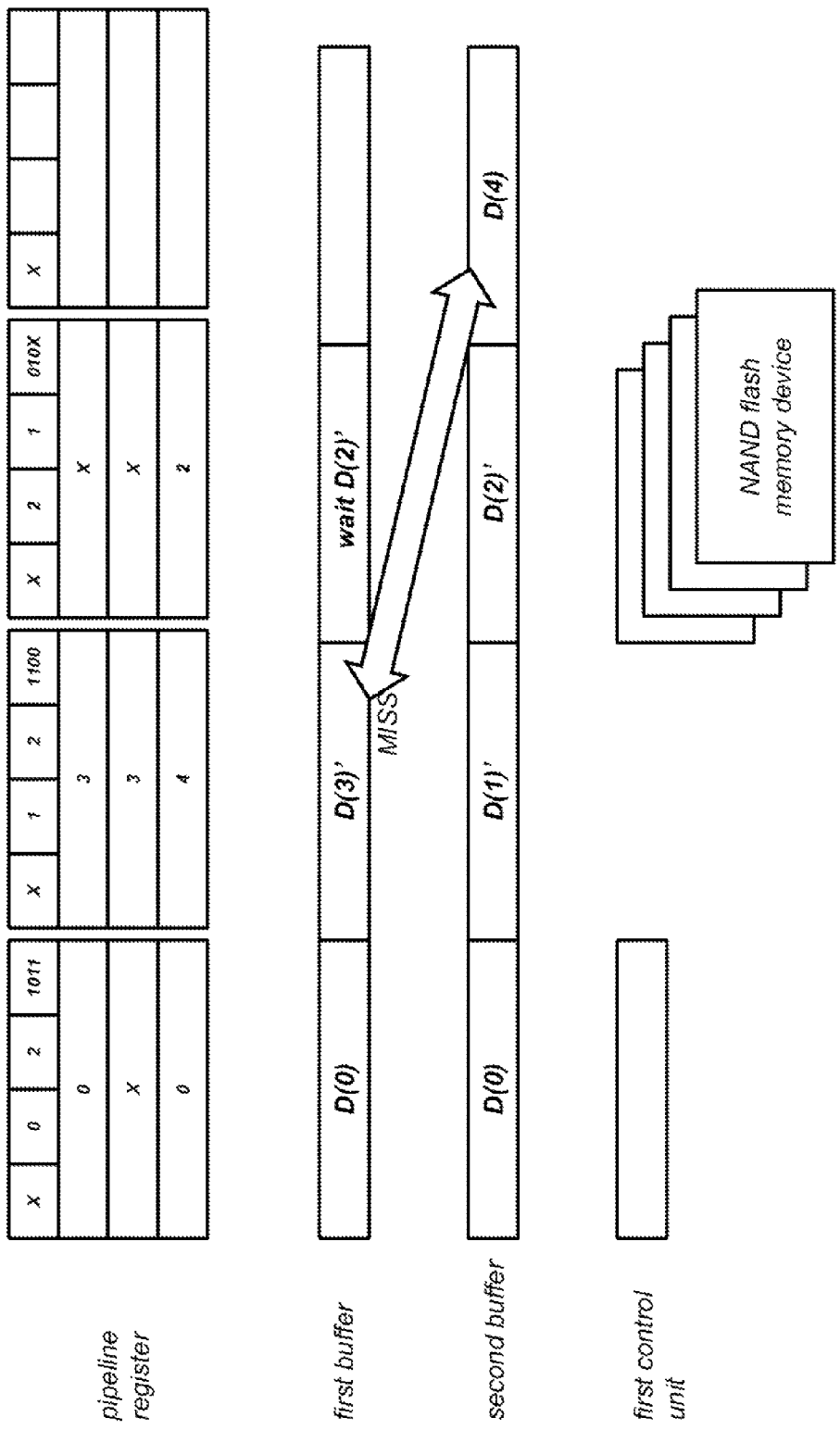

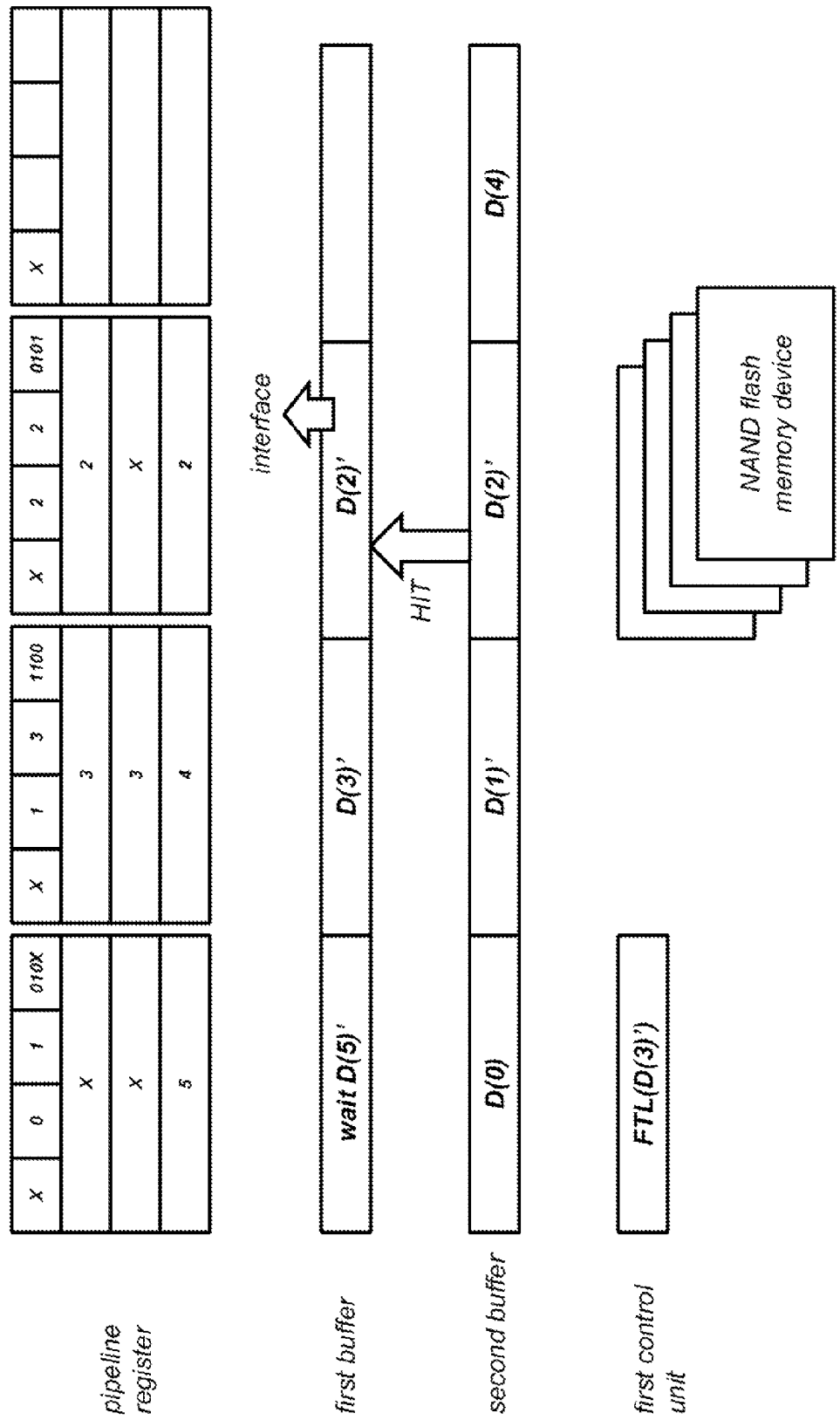

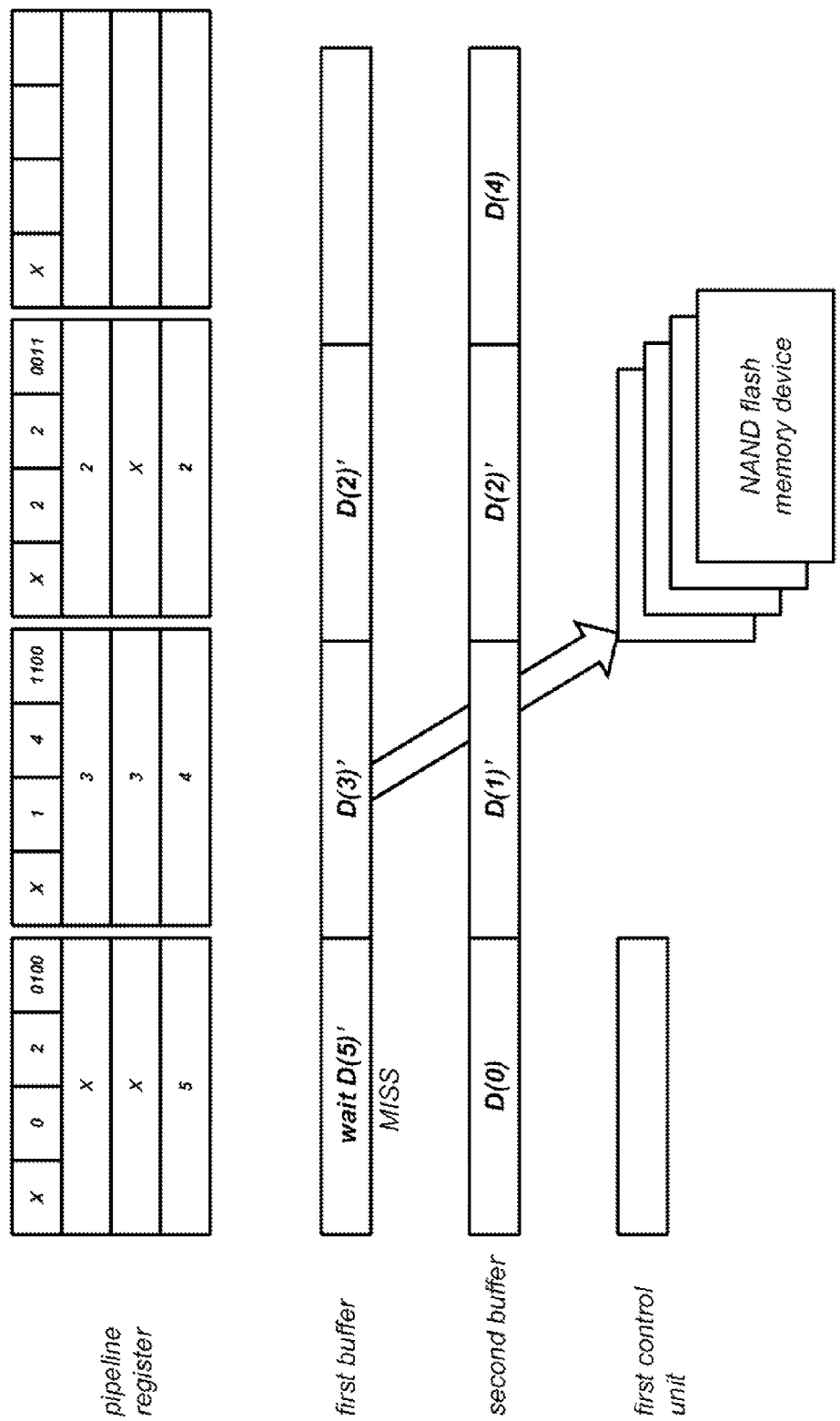

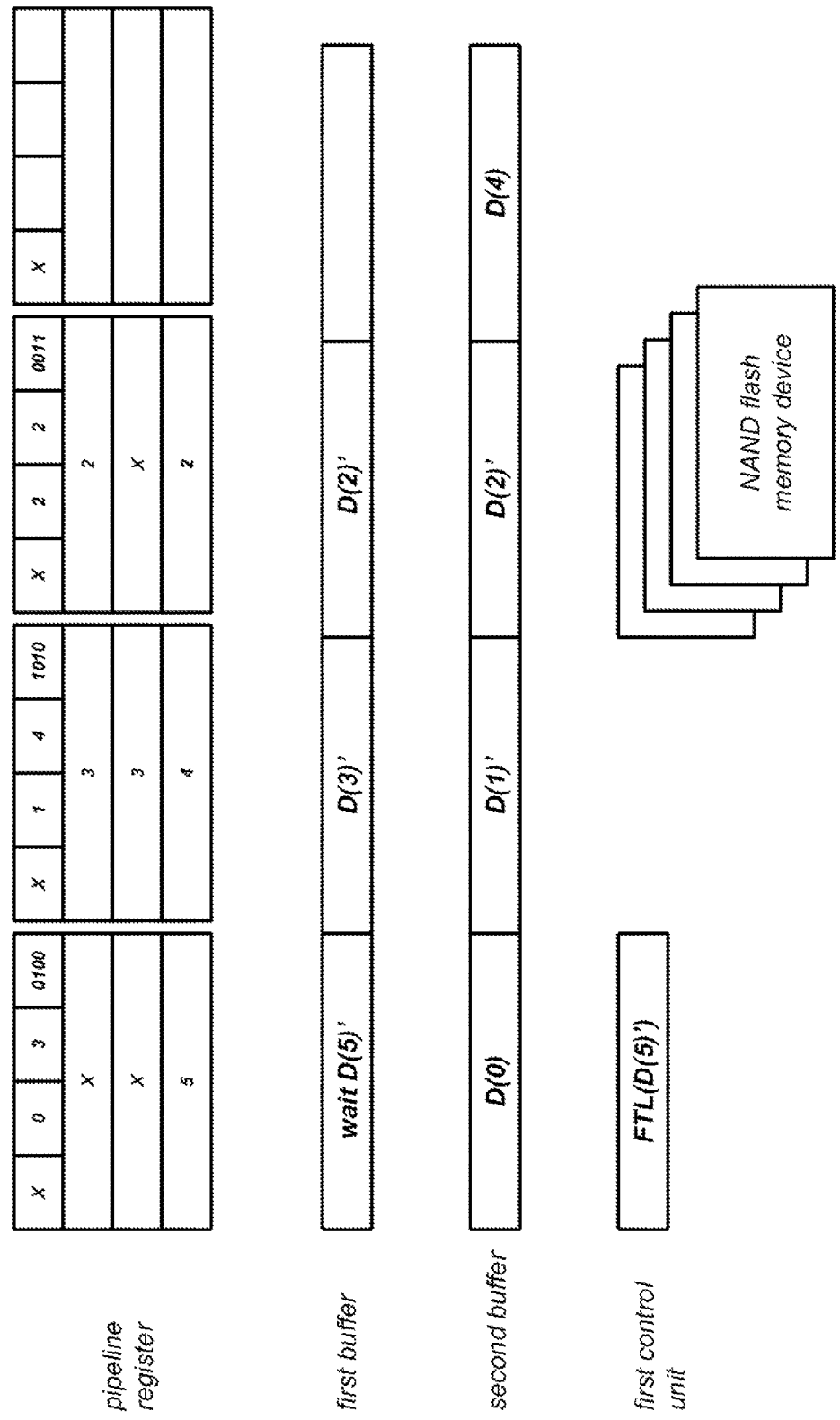

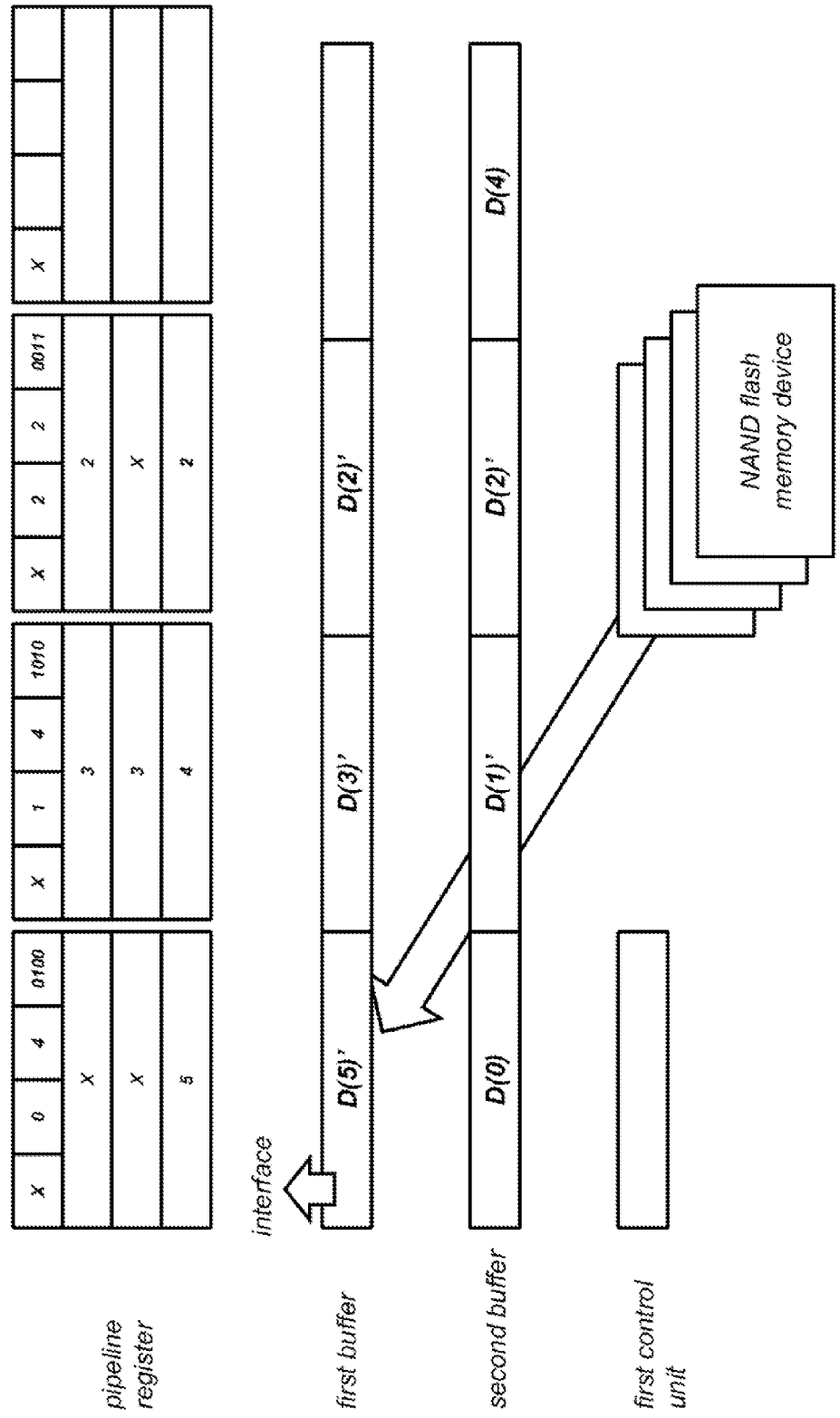

PIPELINED DATA I/O CONTROLLER AND SYSTEM FOR SEMICONDUCTOR MEMORY

CROSS-REFERENCE TO RELATED APPLICATIONS

The present application claims priority of Korean Patent Application No. 10-2012-0010595, filed on Feb. 2, 2012, which is incorporated herein by reference in its entirety.

BACKGROUND

1. Field

Embodiments of the present invention relate to a data I/O controller and a system including the same, and more particularly, to a data I/O controller capable of processing a plurality of external requests at the same time according to a pipeline scheme, and a system including the same.

2. Description of the Related Art

Recently, a solid state drive (SSD), which replaces an existing hard disk drive (HDD) including a magnetic plate as a storage medium, is widely being used. The SSD includes a semiconductor memory device, and especially includes a nonvolatile semiconductor memory device, as a storage medium.

Data processing speed or a data processing unit of the semiconductor memory device included in the SSD may differ from data processing speed or a data processing unit required by an external device of the SSD. Furthermore, there are various limitations in controlling the semiconductor memory device included in the SSD. Accordingly, the performance of the SSD may be deteriorated.

For example, a NAND flash memory that is widely used in a conventional SSD cannot perform an overwrite operation, and instead performs read and write operations by page units while performing an erase operation by block units, wherein a block is larger than a page. And in the NAND flash memory including multi-level cells (MLCs), it takes a longer time to perform the read and write operations than in the NAND flash memory including single-level cells (SLCs). As a result, in the conventional SSD including the NAND flash memory, a bottleneck phenomenon may occur due to such a data processing speed of the NAND flash memory.

In order to solve the above problem, the conventional SSD has employed a write-back method using a volatile memory device. However, even though the write-back method is employed, the SSD still has to access a NAND flash memory. Therefore, an evitable delay may occur during the access to the NAND flash memory. Furthermore, according to the recent trend, a bandwidth required for an operation of the SSD has been increased. Therefore, a bandwidth loss caused by the write-back method may degrade the performance of the SSD.

The above problem has been described in association with the SSD. However, such a problem may occur in any system including a semiconductor memory device as a data storage medium.

SUMMARY

Various embodiments of the present invention are directed to a data I/O controller capable of processing a plurality of external requests at the same time according to a pipeline scheme, and a system including the same.

Also, various embodiments of the present invention are directed to a controller for an SSD, which is capable of processing a plurality of external requests at the same time according to a pipeline scheme, and a system including the same.

In accordance with an embodiment of the present invention, there is provided a controller which controls data I/O for a semiconductor memory device. The controller includes: a first buffer configured to transmit and receive data to and from an interface and the semiconductor device; a first control unit configured to control the semiconductor memory device according to an external request; and a second control unit configured to control the first buffer and the first control unit to process a plurality of external requests according to a pipeline scheme.

The second control unit may control the first buffer and the first control unit to perform pipeline stages including: a first stage at which the first buffer is allocated; and a second stage at which data is transferred between the first buffer and the semiconductor memory device according to the external request.

When the external request is a data write request, the data from the interface may be stored in the first buffer at the first stage, and the data of the first buffer may be stored in the semiconductor memory device at the second stage.

When the external request is a data read request, the data of the semiconductor memory device may be stored in the first buffer and then provided to the interface at the second stage.

The controller may include a pipeline register configured to store information on pipeline stages at which the external requests are processed and/or requested addresses of the external requests.

The second control unit may control the first buffer and the first control unit to perform pipeline stages including: a first stage at which the first buffer is allocated; a second stage at which the first control unit generates an internal command according to an external command; and a third stage at which data is transferred between the first buffer and the semiconductor memory device according to the internal command.

When the external request is a data write request, the data from the interface may be stored in the first buffer at the first stage, and the data of the first buffer may be stored in the semiconductor memory device at the third stage.

When the external request is a data read request, the data of the semiconductor memory device may be stored in the first buffer and provided to the interface at the third stage.

The semiconductor memory device may include a nonvolatile memory device.

The semiconductor memory device may include a flash memory device, and the first control unit may perform a flash translation layer (FTL) operation to generate an internal command corresponding to the external request.

The controller may further include a second buffer configured to transmit and receive data to and from the first buffer according to control of the second control unit.

The second control unit may control the first buffer, the second buffer, and the first control unit to perform pipeline stages including: a first stage at which the first buffer is allocated; a second stage at which whether data of an address corresponding to the external request exists or not is determined, and data is transferred between the first and second buffers when the data of the address corresponding to the external request exists in the second buffer; and a third stage at which data is transferred between the semiconductor memory device and the first buffer according to be external request, when the data of the address corresponding to the external request does not exist in the second buffer.

When the external request is a data write request, the data from the interface may be stored in the buffer at the first stage, and the data of the first buffer may be stored in the second buffer at the second stage, when the data of the address corresponding to the external request exists in the second buffer. Furthermore, the data of the second buffer may be exchanged with the data of the first buffer and then stored at the second stage and the data of the first buffer may be stored in the semiconductor memory device according to the external device at the third stage, when the data of the address corresponding to the external request does not exist in the second buffer.

When the external request is a data read request, the data of the second buffer may be stored in the first buffer and provided to the interface at the second stage, when the data of the address corresponding to the external request exists in the second buffer. The data of the semiconductor memory device is stored in the first buffer and then provided to the interface according to the external request at the third stage, when the data of the address corresponding to the external request does not exist in the second buffer.

The controller may further include a register including information on pipeline stages at which the external requests are processed and/or requested addresses of the external requests.

The second control unit may control the first buffer, the second buffer, and the first control unit to perform pipeline stages including: a first stage at which the first buffer is allocated; a second stage at which whether data of an address corresponding to the external request exists in the second buffer or not is determined, and data is transferred between the first and second buffer when the data of the address corresponding to the external request exists in the second buffer; a third stage at which the first control unit performs the FTL operation to generate the internal command when the data of the address corresponding to the external request does not exist in the second buffer; and a fourth stage at which data is transferred between the semiconductor memory device and the first buffer according to the internal command.

When the external request is a data write request, the data from the interface may be stored in the first buffer at the first stage, and the data of the first buffer may be stored in the second buffer at the second stage, when the data of the address corresponding to the external request exists in the second buffer. Furthermore, the data of the second buffer may be exchanged with the data of the first buffer at the second stage and the data of the first buffer may be stored in the semiconductor memory device according to the internal command at the fourth stage, when the data of the address corresponding to the external request does not exist in the second buffer.

When the external request is a data read request, the data of the second buffer may be stored in the first buffer and provided to the interface at the second stage, when the data of the address corresponding to the external request exists in the second buffer. The data of the semiconductor memory device may be stored in the first buffer and provided to the interface according to the internal command at the fourth stage, when the data of the address corresponding to the external request does not exist in the second buffer.

The semiconductor memory device may include a non-volatile memory device.

The semiconductor memory device may include a flash memory device, and the first control unit may perform an FTL operation to generate an internal command corresponding to the external request.

In accordance with another embodiment of the present invention, a system includes: a semiconductor memory device; and a controller including: a first buffer configured to transmit and receive data to and from an interface and the semiconductor memory device; a first control unit configured to control the semiconductor memory device according to an external request; and a second control unit configured to control the first buffer and the first control unit to process a plurality of external requests at the same time according to a pipeline scheme.

The controller may further include a second buffer configured to transmit and receive data to and from the first buffer according to control of the second control unit.

The semiconductor memory device may include a non-volatile memory device.

The semiconductor memory device may include a flash memory device.

The first control unit may perform an FTL operation to generate an internal command corresponding to the external request.

The semiconductor memory device may include a plurality of memory blocks, each of which is independently controlled by the controller.

The system may include a solid state drive (SSD).

BRIEF DESCRIPTION OF THE DRAWINGS

FIG. 2 illustrates a structure of a pipeline register included in the controller of FIG. 1.

FIG. 6 illustrates a structure of a pipeline register included in the controller of FIG. 5.

FIGS. 9A to 9C illustrate various scenarios of a pipeline operation for a plurality of external requests, which is performed in the controller of FIG. 5.

FIGS. 10A to 10G are diagrams for explaining the pipeline operation illustrated in FIG. 8.

DETAILED DESCRIPTION

Figure 1:
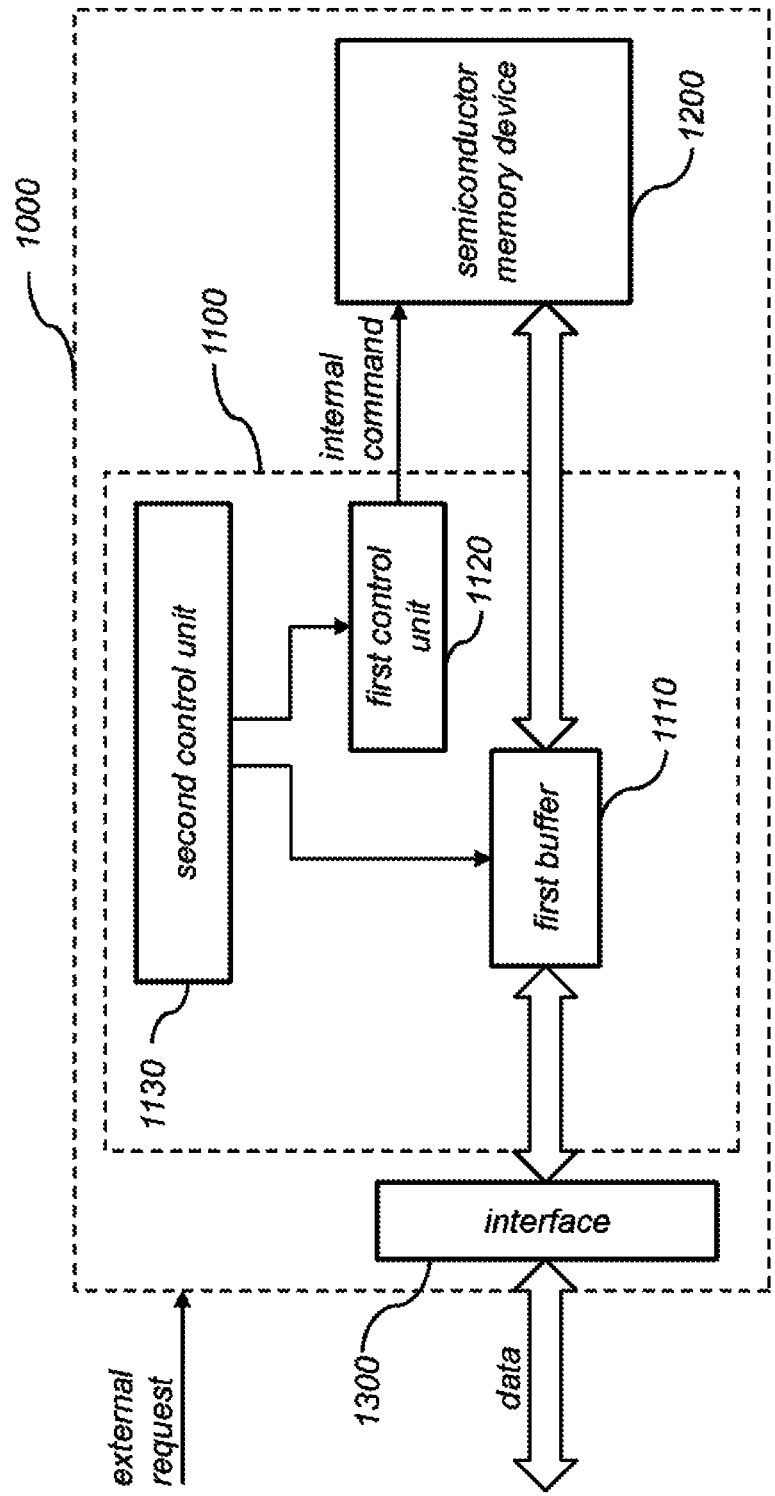
FIG. 1 illustrates a block diagram of a controller and a system according to a first embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Embodiment 1

FIG. 1 illustrates a block diagram of a data input/output (I/O) controller 1100 and a system 1000 including the same according to a first embodiment of the present invention.

The system 1000 includes the data I/O controller 1100, a semiconductor memory device 1200, and an interface 1300.

The data I/O controller 1100 includes a first buffer 1110, a first control unit 1120, and a second control unit 1130. The first buffer 1110 is configured to perform data transmission between the interface 1300 and the semiconductor memory device 1200. The first control unit 1120 is configured to generate an internal command for controlling the semiconductor memory device 1200 based on an external request, i.e., a request input from outside the system 1000.

The second control unit 1130 is configured to control the first buffer 1110 and the first control unit 1120 so as to process a plurality of external requests according to a pipeline scheme. A specific example in which the plurality of external requests is processed according to the pipeline scheme will be described below.

The first buffer 1110 may have higher processing speed than the semiconductor memory device 1200, and may include a volatile memory device, such as a DRAM or SRAM device, or a nonvolatile memory device.

The semiconductor memory device 1200 is a storage device capable of storing large-volume data, and may include a nonvolatile memory device, but it is not limited thereto. The nonvolatile memory device may include a flash memory, a phase change memory, a magnetic memory device, or the like. Existing nonvolatile memory devices and nonvolatile memory devices to be developed in the future may be applied to the system 1000 according to embodiments of the present invention.

The first control unit 1120 generates an internal command corresponding to an external request. The external request may include a data read command, a data write command, or the like. For example, if the external request is a request for writing data B at a storage location corresponding to an address A, the first control unit 1120 may generate one or more internal commands for controlling the semiconductor memory device 1200 to perform an operation of writing the data B at the storage location corresponding to the address A. The generation of the internal command corresponding to the external request may be easily designed by those skilled in the art according to the specifications of the semiconductor memory device 1200.

Depending on a type of the semiconductor memory device 1200, the internal command corresponding to the external request may have a different form. For example, although the same external request (for example, a data read or write operation for a specific address) is applied to the system 1000, the number and/or forms of internal commands for controlling the semiconductor memory device 1200 that is a flash memory may differ from the number and/or forms of internal commands for controlling the semiconductor memory device 1200 that is a phase change memory. Furthermore, an address (logical address) included in the external request and its corresponding address (physical address) in the semiconductor memory device 1200 may be equal to or different from each other. In addition, the physical address corresponding to the logical address may be differently decided depending on the type of the semiconductor memory device 1200. Therefore, the internal commands may include a physical address obtained by converting a logical address included in the external request into a form suitable for the semiconductor memory device 1200.

Referring to FIG. 1, the interface 1300 is positioned outside the data I/O controller 1100. According to another embodiment, the interface 1300 may be positioned inside the data I/O controller 1100. The interface 1300 serves to receive from and output data to outside the system 1000. Although it is not illustrated, an interface serving to receive the external request may be additionally included in the system 1000.

According to another embodiment, the data I/O controller 1100 may further include a pipeline register unit having a plurality of pipeline registers (not illustrated) that is configured to store current processing states of a plurality of external requests simultaneously processed according to the pipeline scheme. The second control unit 1130 may determine the current processing states of the external requests by referring to data stored in the pipeline registers, and may control the first buffer 1110 and the first control unit 1120 to implement the pipeline scheme for simultaneously processing the external requests. An example of the pipeline registers in the data I/O controller 1100 and associated operations are further described below and illustrated in the subsequent drawings referenced herein.

FIG. 2 illustrates a structure of a pipeline register allocated to each of the external requests. The pipeline register illustrated in FIG. 2 has a 32-bit width, but may be easily modified by those skilled in the art according to another embodiment.

In FIG. 2, "Entry Index" represents a number allocated to identify an external request.

"STAGE" represents a pipeline stage that is currently performed for the external request.

"RW" represents whether the external request is a read or write request. For example, if RW is '1 (or T)', it indicates that the external request is a write request, and if RW is '0 (or F)', it indicates that the external request is a read request.

"Valid" represents whether the external request is being processed or not. For example, if Valid is 1 (or T), it indicates that the external request is being processed, and if Valid is 0 (or F), it indicates that the external request is not being processed or has been processed.

"Complete" represents whether a current pipeline stage was completed or not. For example, if Complete is 1 (or T), it indicates that the current pipeline stage was completed, and if Complete is 0 (or F), it indicates that the current pipeline stage was not completed.

"Requested Address" represents an address (logical address) of a location where data is to be read or written according to the external request. In the following description, a bit value of 1 is used as the same as T, and a bit value of 0 is used as the same as F.

The pipeline register illustrated in FIG. 2 has a data structure allocated to one external request. Therefore, the data I/O controller 1100 may include a plurality of pipeline registers according to a number of external requests that are processed at the same time. Furthermore, since the structure of the pipeline register illustrated in FIG. 2 is an example, the structure may be easily modified or changed by those skilled in the art.

Figure 3:
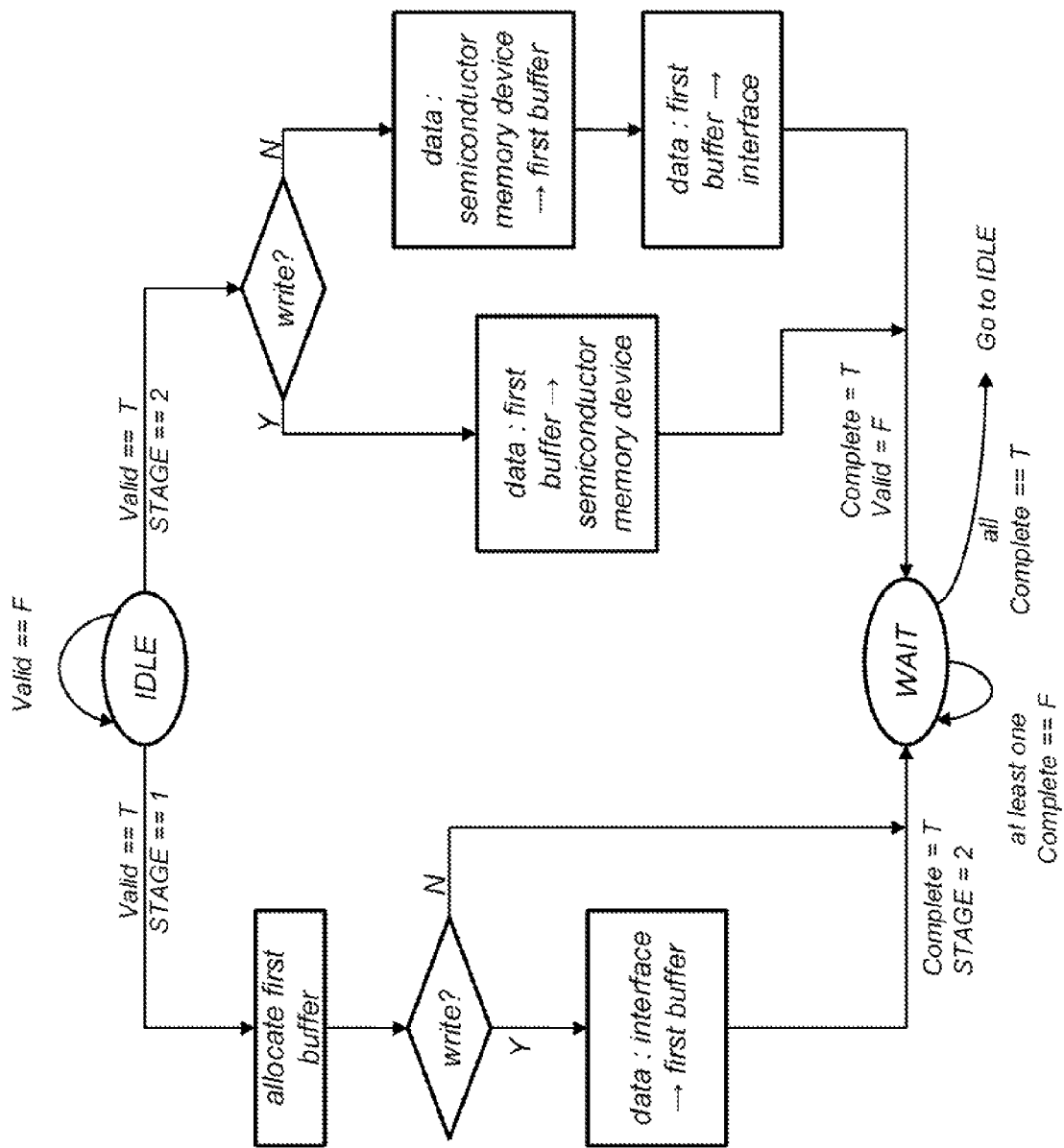
FIG. 3 is a finite state machine (FSM) diagram illustrating a pipeline operation performed in the controller of FIG. 1.

FIG. 3 is a finite state machine (FSM) diagram illustrating a pipeline operation that is performed in the data I/O controller 1100 illustrated in FIG. 1.

The pipeline operation is performed by the control of the second control unit 1130. Such an operation may be implemented in the second control unit 1130 by means of software, hardware, or a combination of software and hardware.

In FIG. 3, "IDLE" represents a standby state in which there is no external request inputted to the system 1000. When an external request is first inputted, a pipeline register corresponding to the external request, for example, the pipeline register illustrated in FIG. 2 is set to have: Valid=T, Complete=F, and STAGE=1. Accordingly, a procedure for the external request proceeds to a first stage. When the external request has been already processed, the procedure proceeds to a corresponding stage according to a value set in "STAGE".

At the first stage (STAGE=1), the first buffer 1110 is allocated to store data to be written or data to be read. Then, whether the external request is a read or write request is determined, according to an RW value of the pipeline register that is set.

When the external request is determined to be a write request, data of the interface 1300 is stored in the first buffer 1110, and the pipeline register is set to have: Complete=T and STAGE=2. Then, the procedure proceeds to a WAIT stage.

When the external request is determined to be a read request, the pipeline register is set to have: Complete=T and STAGE=2, without performing any operations. Then, the procedure proceeds to the WAIT state.

At a second stage (STAGE=2), whether the external request is a read or write request is determined through the use of the RW value of the pipeline register.

When the external request is determined to be a write request, data of the first buffer 1110 is stored in the semiconductor memory device 1200, and the pipeline register is set to have: Complete=T and Valid=F so as to announce that the procedure for the external request was completed.

When the external request is determined to be a read request, data of the semiconductor memory device 1200 is stored in the first buffer 1110, and then the data of the first buffer 1110 is provided to the interface 1300. After that, the pipeline register is set to have: Complete=T and Valid=F so as to announce that the procedure for the external request was completed. Then, the procedure proceeds to the WAIT state.

When the first stage (STAGE=1) and the second stage (STAGE=2) are being processed at the same time, the procedure proceeds to an IDLE state only after both of the stages are completed (all Complete==T). Otherwise, the procedure stays in the WAIT state. Through this operation, it is possible to prevent the same pipeline stage from being performed for two different external requests.

In the above-described operation, two pipeline stages, i.e., the first and second stages, are performed. Therefore, the data I/O controller 1100 according to an embodiment of the present invention may process at least two external requests at the same time. However, the FSM diagram shown in FIG. 3 may be changed and modified according to other embodiments of the invention. For instance, in accordance with another embodiment, the number of external requests to be processed at the same time may increase.

For example, when the semiconductor memory device 1200 includes a plurality of independent memory blocks that may be accessed at the same time, the second stage may be simultaneously performed for a plurality of external requests. That is, if two memory blocks exist and the second stage is being performed for one memory block, the second stage may be performed in parallel to another external request. This configuration may be usefully applied when it takes a long time to perform the second stage because the access to the semiconductor memory device 1200 requires a long time. This will be described later with reference to FIG. 9C.

The pipeline operation of FIG. 3 may be modified by those skilled in the art. In this case, with the increase in the number of external requests that may be processed at the same time, pipeline registers may be added.

Hereafter, embodiments will be described under the supposition that the semiconductor memory device 1200 includes one memory block, for convenience of description.

FIG. 3 illustrates an embodiment in which two pipeline stages are performed. According to another embodiment, the number of pipeline stages may change. In addition to the first and second stages of FIG. 3, a separate pipeline stage may be added. For example, a stage at which the first control unit 1120 generates an internal command corresponding to an external request may be added as the separate pipeline stage. According to another embodiment, an additional buffer (not illustrated) may be installed between the first buffer 1100 and the semiconductor memory device 1200 so as to add a pipeline stage. The performance optimization through the addition or modification of the pipeline stage may be easily performed by those skilled in the art.

Figure 4:
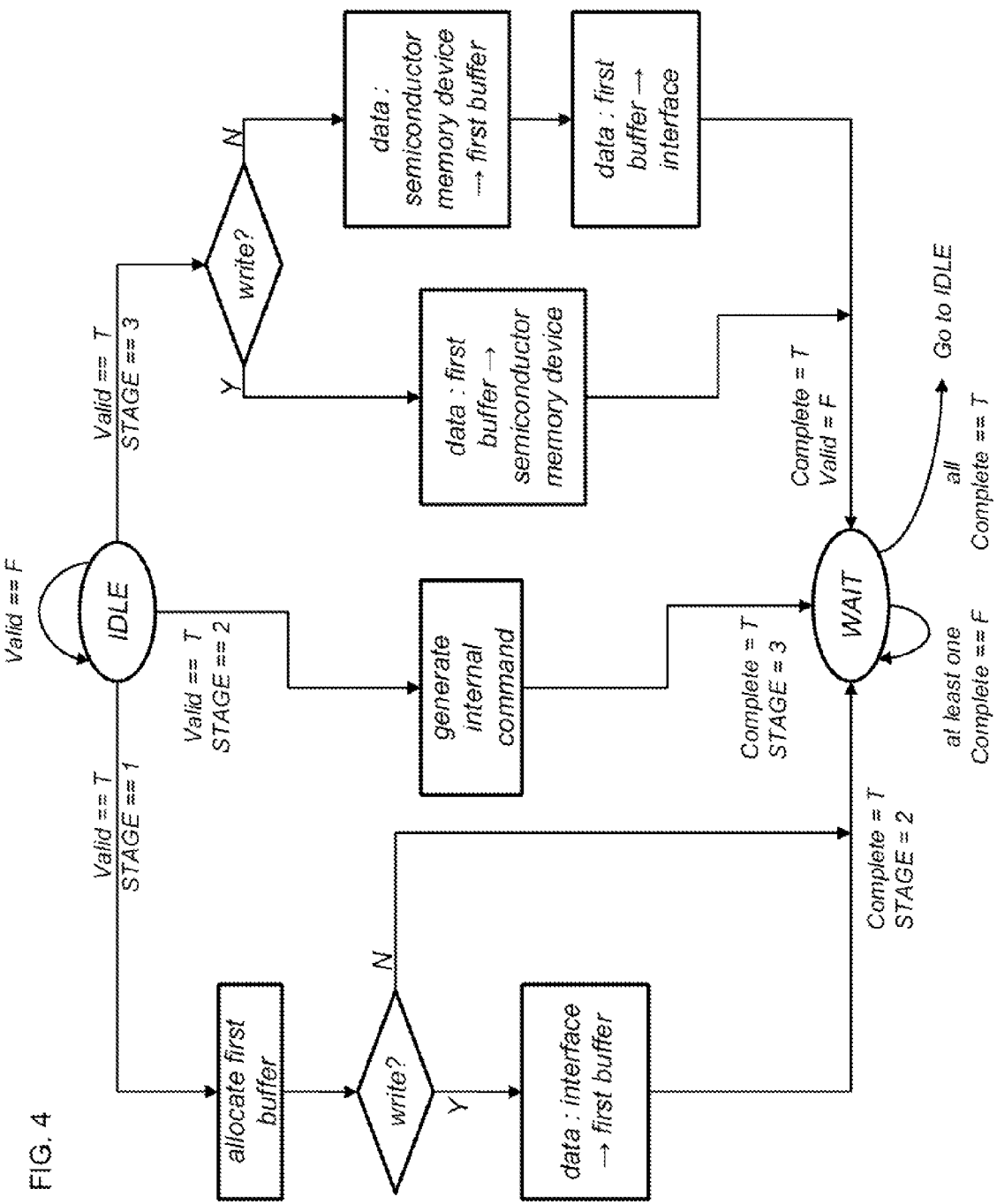
FIG. 4 is an FSM diagram illustrating another pipeline operation performed by the controller of FIG. 1.

FIG. 4 is an FSM diagram illustrating another pipeline operation performed by the data I/O controller 1100 illustrated in FIG. 1.

Referring to FIG. 4, a stage at which the first control unit 1120 generates an internal command is added as a separate pipeline stage (STAGE=2) to the FSM diagram of FIG. 3. This configuration may be useful when it takes a sufficiently long time for the first control unit 1120 to generate the internal command. Since the embodiment shown in FIG. 4 includes three pipeline stages, three external requests may be processed at the same time.

When entering the second stage (STAGE=2), the first control unit 1120 generates an internal command to control the semiconductor memory device 1200. Then, the pipeline register is set to have: Complete=T and STAGE=3, and the procedure proceeds to the WAIT state.

Since the operations of the IDLE state, the WAIT state, the first stage (STAGE=1), and the third stage (STAGE=3) have been already described with reference to FIG. 3, the detailed description thereof is omitted herein.

If the semiconductor memory device 1200 includes a NAND flash memory, the operation of the first control unit 1120 to generate the internal command may be referred to as a flash translation layer (FTL) operation. Since various techniques for the FTL operation are well known, the detailed description thereof is omitted herein.

As well known, the first control unit 1120 to perform the FTL operation may be implemented in hardware, software, or a combination of hardware and software. Furthermore, one or more internal commands generated through the FTL operation may be stored in a separate register (not illustrated) and used to control a data I/O operation of the semiconductor memory device 1200.

Second Embodiment

Figure 5:
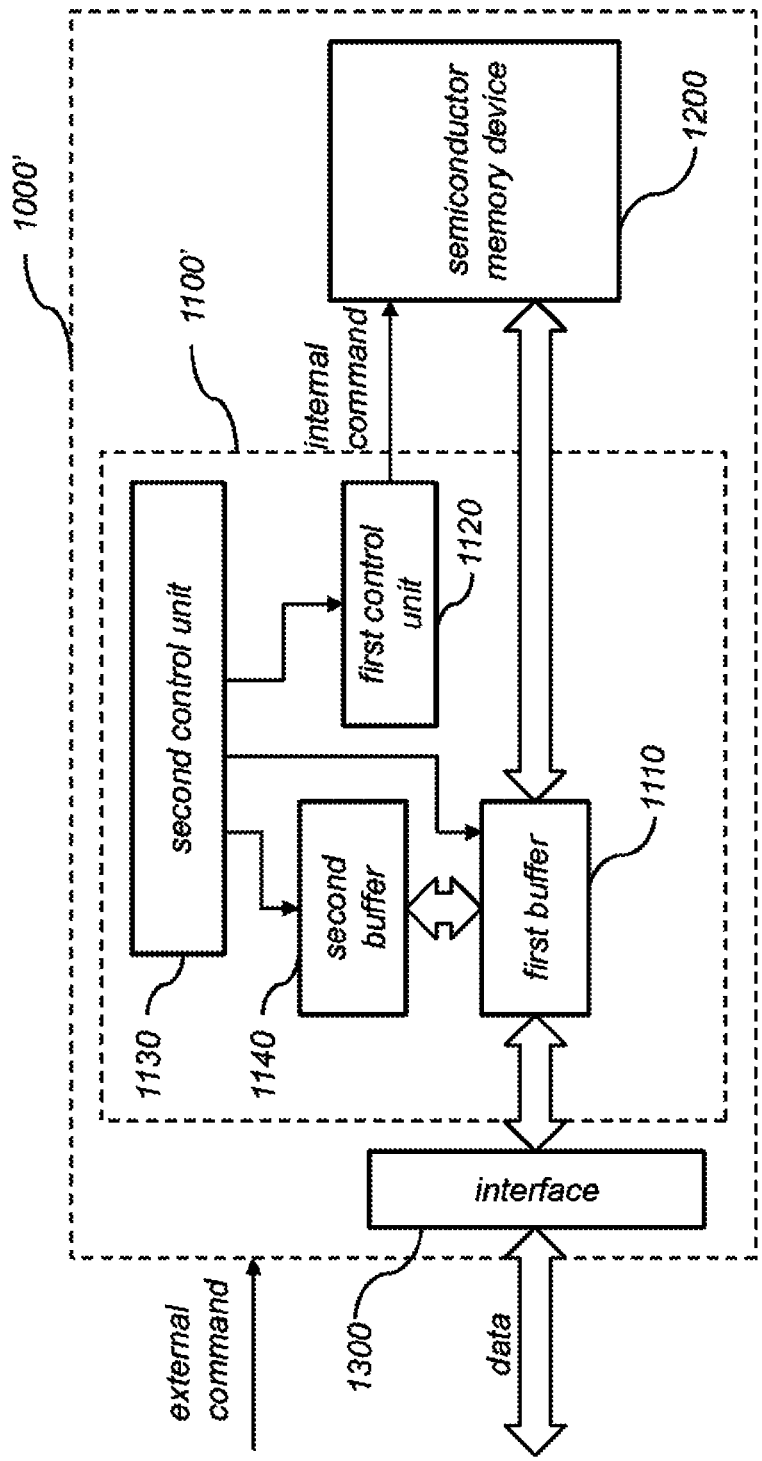
FIG. 5 illustrates a block diagram of a controller and a system according to a second embodiment of the present invention.

FIG. 5 illustrates a block diagram of a data I/O controller 1100' and a system 1000' including the same according to a second embodiment of the present invention. The data I/O controller 1100' according to the second embodiment further includes a second buffer 1140 in addition to the data I/O controller 1100 according to the first embodiment illustrated in FIG. 1. The pipeline registers, as described below and illustrated in the subsequent drawings, are also included in the data I/O controller 1100'.

In the second embodiment, the second buffer 1140 serves as a kind or type of cache. That is, when data requested by an external device exists in the second buffer 1140, a process for an external request may be completed without accessing the semiconductor memory device 1200. Accordingly, it is possible to increase processing speed.

FIG. 6 illustrates a structure of a pipeline register that may be further included in the data I/O controller 1100' according to the second embodiment of the present invention. The pipeline register of FIG. 6 corresponds to one external request. According to the number of external requests, additional registers may be allocated.

In the pipeline register in FIG. 6, "Entry Index" serves to identify an external request, and "STAGE" serves to identify a pipeline stage at which the external request is being processed.

"RW" represents whether the external request is a read or write request. For example, if RW is '1 (or T)', it indicates that the external request is a write request, and if RW is '0 (or F)', it indicates that the external request is a read request.

"Valid" represents whether the external request is being processed or not. For example, if Valid is 1 (or T), it indicates that the external request is being processed, and if Valid is 0 (or F), it indicates that the external request is not processed or has been processed.

"Complete" represents whether a current pipeline stage was completed or not. For example, if Complete is 1 (or T), it indicates that the current pipeline stage was completed, and if Complete is 0 (or F), it indicates that the current pipeline stage was not completed. "Requested address" indicates an address (logical address) of a location where data is to be read or written according to the external request.

"Hit" represents whether data corresponding to the requested address exists in the second buffer 1140 or not. For example, if Hit is 1 (or T), it indicates that the data corresponding to the requested address (logical address) exists in the second buffer 1140, and if Hit is 0 (or F), it indicates that the data corresponding to the requested address (logical address) does not exist in the second buffer 1140.

"Cache Address" represents an address (logical address) of data corresponding to the requested address (logical address), and "Evicted Cache Address" represents an address (logical address) of data, which is evicted from the second buffer 1140. Another data may be stored in the second buffer 1140 if that another data corresponding to a requested address (logical address) did not exist in the second buffer 1140 during the request (i.e., a Hit did not occur during that request).

Figure 7:
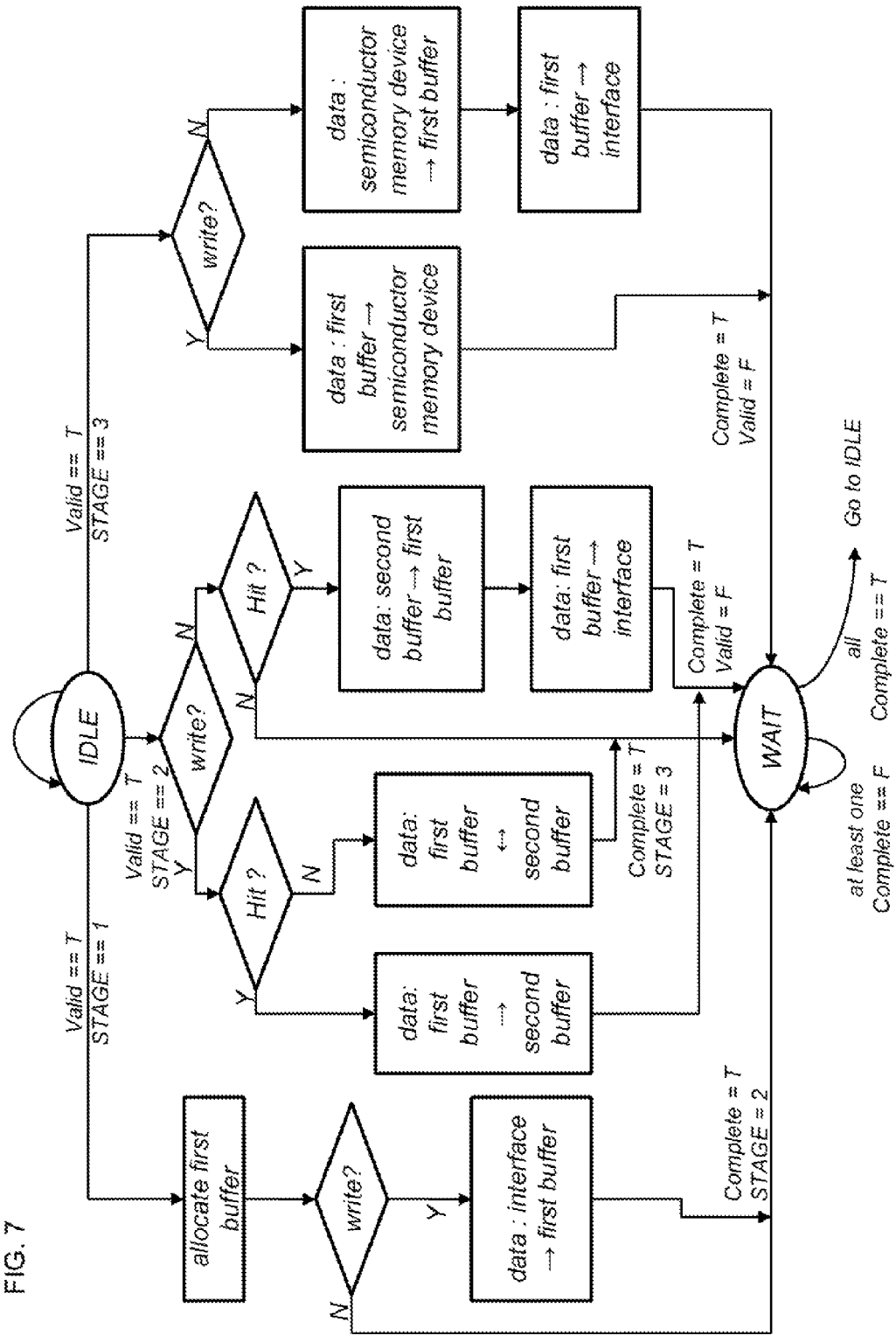
FIG. 7 is an FSM diagram illustrating a pipeline operation performed in the controller of FIG. 5.

FIG. 7 is an FSM diagram illustrating a pipeline operation performed in the data I/O controller 1100' according to the second embodiment of the present invention.

In the second embodiment, another stage, i.e., a second stage (STAGE=2) in FIG. 7, is added to the FSM diagram of FIG. 3 illustrating the first embodiment because the second buffer 1140 is added.

Since operations of an IDLE state, a WAIT state, a first stage (STAGE=1), and a third stage (STAGE=3) in FIG. 7 are the same as those in FIG. 3 and have been already described with reference to FIG. 3, the third stage in FIG. 7 being the same as the second stage in FIG. 3, the following description will focus on an operation of the newly added second stage.

At the second stage (STAGE=2), whether an external request is a read or write request is determined by referring to an RW bit in a pipeline register, and whether or not data of a requested address exists in the second buffer 1140 are determined (Hit or Miss) by referring to a Hit bit in the pipeline register. Referring to FIG. 7, the determination for the read/write request is performed before the determination for the existence of data in the second buffer 1140, but the sequence thereof may be changed.

First, a case in which the external request is a write request will be described.

If the external request is a write request and Hit is 1, data corresponding to the requested address exists in the second buffer 1140. Therefore, the data corresponding to the requested address existing in the second buffer 1140 is over-written by new data, and the pipeline register is set to have: Complete=T and Valid=F. The procedure proceeds to the WAIT state.

On the other hand, if Hit is 0, that is, the data corresponding to the requested address does not exist in the second buffer 1140, arbitrary data (evicted data) of the second buffer 1140 is exchanged with data, which is inputted from the interface 1300 and stored in the first buffer 1110. At this time, an address (logical address) of the data evicted from the second buffer 1140 is written in a cache address field and an evicted cache address field of the pipeline register, and the pipeline register is set to have: Complete=T and STAGE=3. Then, the procedure proceeds to the WAIT state. The data written in the second buffer 1140 is transferred to the first buffer 1110 and then written into the semiconductor memory device 1200 at subsequent pipeline stages.

Next, a case in which the external request is a read request will be described.

If the external request is a read request and Hit is 1, the data of the second buffer 1140 is transferred to the first buffer 1110, and then the data stored in the first buffer 1110 is provided to the interface 1300. After that, the pipeline register is set to have: Complete=T and Valid=F, and the procedure proceeds to the WAIT state.

On the other hand, if Hit is 0, the pipeline register is set to have: Complete=T and STAGE=3, without performing any operations. Then, the procedure proceeds to the WAIT state.

In short, if Hit is 1, the process for the corresponding external request is completed at the second stage, but if Hit is 0, the process for the corresponding external request is completed at the third stage.

The second buffer 1140 may be implemented with a memory device that operates at higher speed than the semiconductor memory device 1200.

Accordingly, a time required for processing a plurality of external requests in the pipeline operation of FIG. 7 may be shorter than in the pipeline operation of FIG. 3. In particular, when the address of an external request is randomly changed, that is, when the probability of Hit=1 is similar to the probability of Hit=0, the processing speed may be improved whenever a Hit occurs. The size of the second buffer 1140 and a detailed caching technique for optimizing caching efficiency may be easily modified and changed by those skilled in the art. The modification and change may be included in the scope of the present invention.

Figure 8:
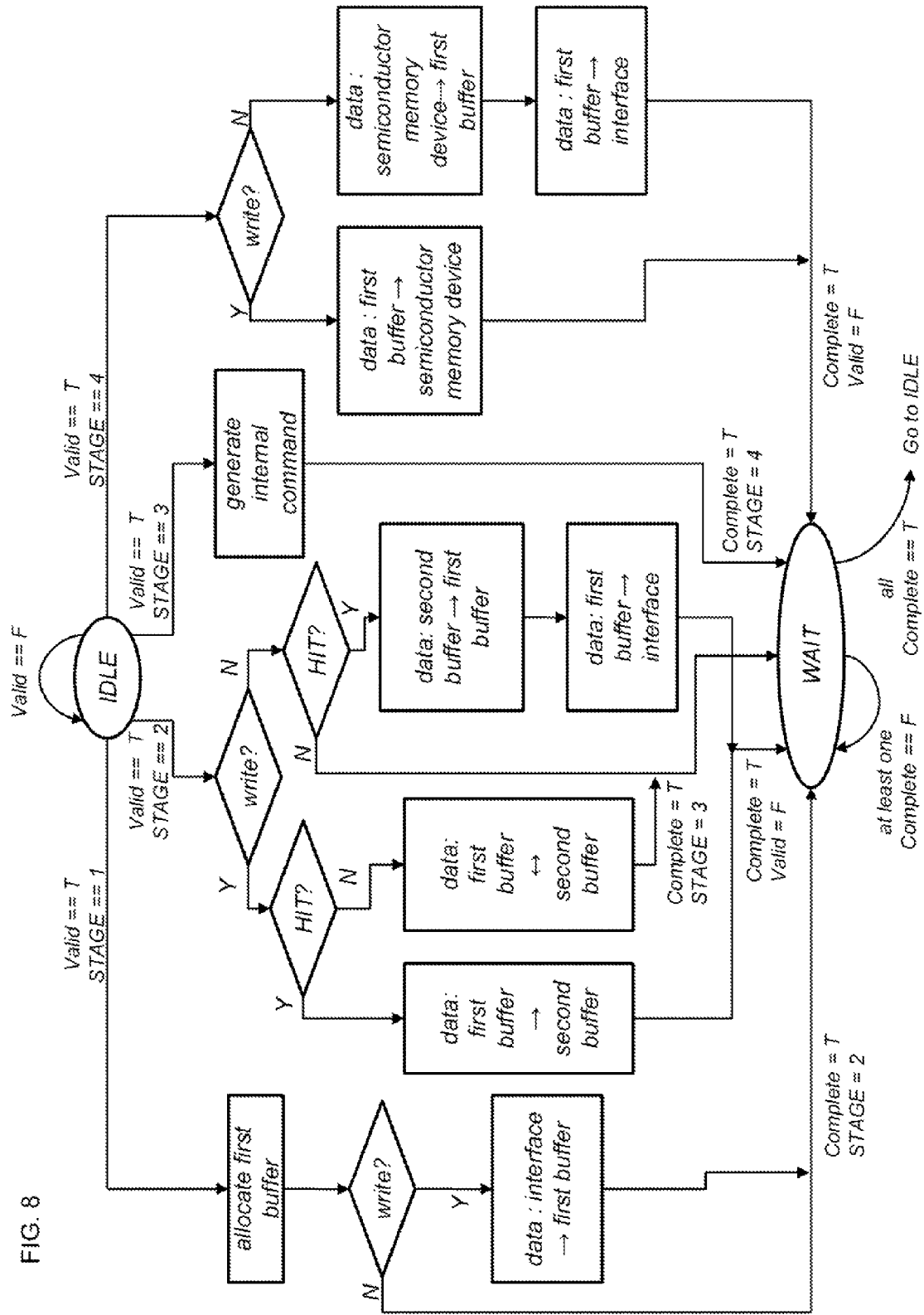
FIG. 8 is an FSM diagram illustrating another pipeline operation performed in the controller of FIG. 5.

FIG. 8 is an FSM diagram illustrating another pipeline operation performed in the data I/O controller 1100' according to the second embodiment of the present invention.

Referring to FIG. 8, a stage at which the first control unit 1120 generates an internal command is added as a separate pipeline stage to the FSM diagram of FIG. 7.

Operations of the other stages of FIG. 8 (other than the additional stage) are substantially the same as those in FIG. 7. Furthermore, since the stage at which the first control unit 1120 generates an internal command is performed in substantially the same manner as described with reference to FIG. 4, the detailed description thereof is omitted herein.

Figure 9C:
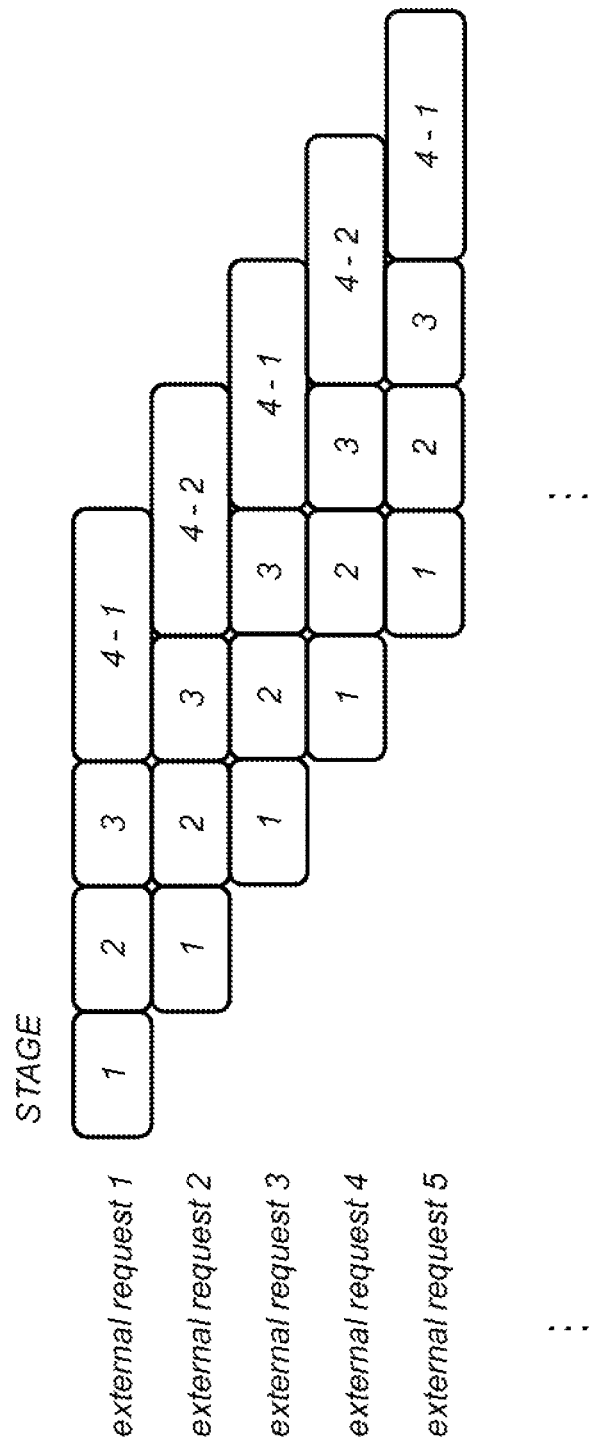

FIGS. 9A to 9C illustrate various scenarios of the pipeline operation performed based on the FSM diagram of FIG. 8 in connection with the semiconductor memory device 1200 of FIG. 5. In FIGS. 9A to 9C, it is assumed that first to fourth stages are performed for external requests 1 to 5.

FIG. 9A illustrates a case in which four pipeline stages have the same processing time.

FIG. 9B illustrates a case in which the fourth stage has a processing time that is two times longer than those of the other stages, i.e., the first to third stages. In this case, until the fourth stage is completed, the other stages stay in the WAIT state. Therefore, the total processing time is delayed as much. When the semiconductor memory device 1200 requires a relatively long processing time, the delay may occur, unlike the case of FIG. 9A.

FIG. 9C illustrates a case in which the semiconductor memory device 1200 includes two memory blocks that may be independently accessed, and access to the two memory blocks are represented by a fourth-first (4-1) stage and a fourth-second (4-2) stage, respectively.

When the semiconductor memory device 1200 includes a plurality of memory blocks to be independently accessed, the delay may be reduced as illustrated in FIG. 9C compared to the delay in FIG. 9B. In FIG. 9C, the two memory blocks are alternately designated by adjacent external requests. However, if addresses designated by the external requests are arbitrarily changed, the processing time may be reduced on average more than in FIG. 9B since designating two memory blocks by adjacent external requests allows an optimize performance as shown in FIG. 9C.

The number of memory blocks to be independently accessed in the semiconductor memory device 1200 may be changed to optimize performance within the scope of the present invention.

FIGS. 10A to 10G are diagrams for explaining the pipeline operation illustrated in FIG. 8.

In FIGS. 10A to 10G, the semiconductor memory device 1200 includes a NAND flash memory device, and the third stage (STAGE=3) represents a stage at which the first control unit 1120 generates an internal command according to the FTL operation.

Referring to FIGS. 10A to 10G, external requests WRITE (0), WRITE(4), READ(2), and READ(5) are sequentially inputted. In each of the above external requests, a number within a round bracket represents a logical address.

In addition, suppose that logical addresses of data stored in the second buffer 1140 at an initial stage are 0, 1, 2, and 3. The data stored in the second buffer 1140 or the NAND flash memory device 1200 is represented by, e.g., D(k)', k being a logical address for the data D, and data inputted from outside is represented by, e.g., D(0).

In FIG. 10A, a first stage operation is performed for the first external request WRITE(0). At this time, data D(0) is inputted to the first buffer 1110 from the interface 1300. The pipeline register corresponding to the external request WRITE(0) is set to have: RW=1, Valid=1, and Complete=0.

Figure 10B:
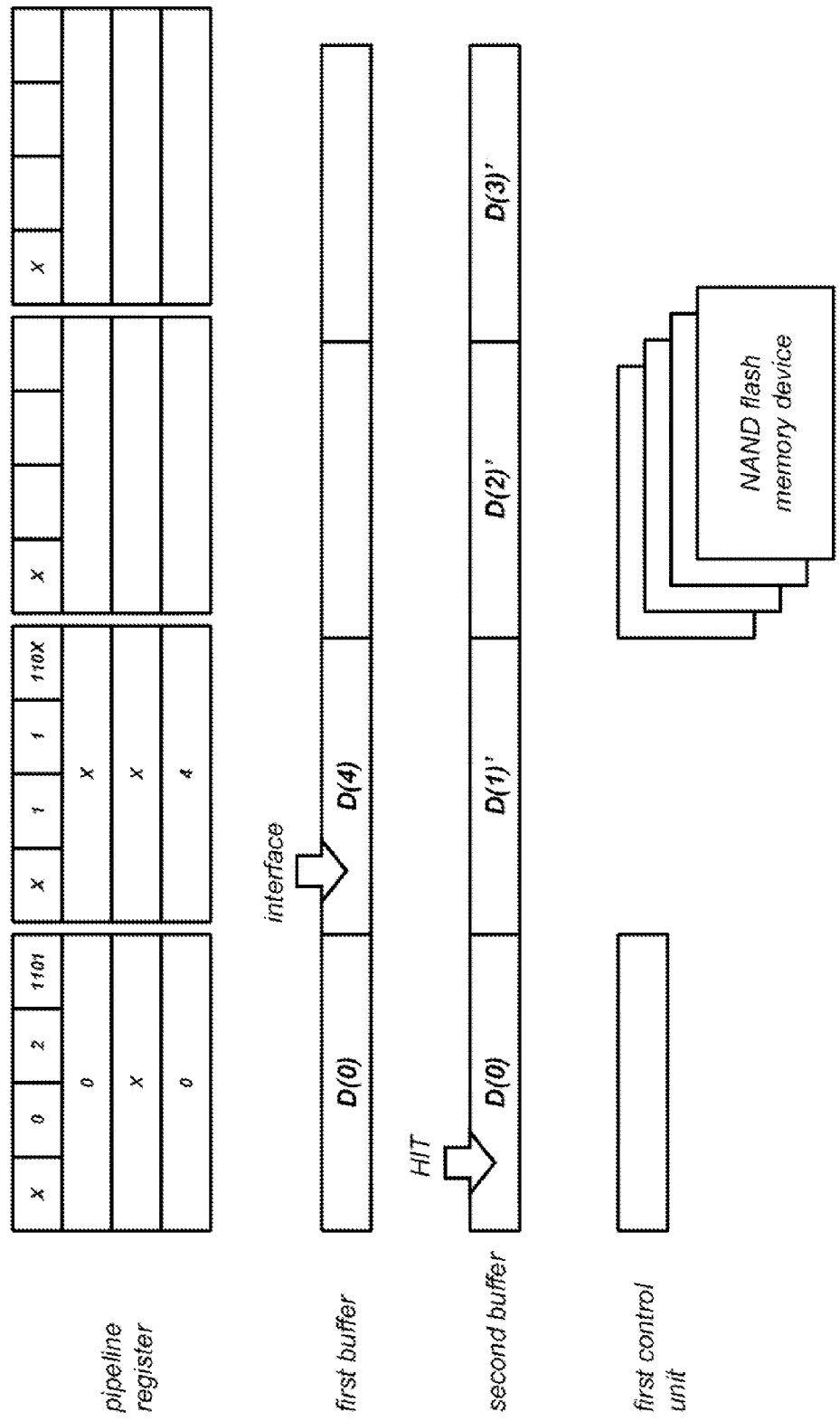

In FIG. 10B, a second stage operation is performed for the first external request WRITE(0). Since Hit is 1, the data D(0) stored in the first buffer 1110 is overwritten into the second buffer 1140. Accordingly, a process for the first external request WRITE(0) is completed.

While the second stage operation is performed for the first external request WRITE(0), the first stage operation is performed for the second external request WRITE(4) such that data D(4) is inputted to the first buffer 1110 from the interface 1300. The pipeline register corresponding to the second external request WRITE(4) is set to have: RW=1, Valid=1, and Complete=0.

In FIG. 10C, since the Valid field in the pipeline register corresponding to the first external request WRITE(0) is set to 0, it can be seen that the process for the first external request WRITE(0) was completed. Accordingly, another request may be allocated to the corresponding pipeline register, i.e., the first pipeline register, as shown in FIG. 10D.

Referring to FIG. 10C, the second stage operation is performed for the second external request WRITE(4). Here, since Hit is 0, the data D(4) stored in the first buffer 1110 is exchanged with arbitrary data, e.g., D(3)', stored in the second buffer 1140. In the pipeline register corresponding to the second external request WRITE(4), both of the cache address and the evicted cache address are set to 3.

While the second stage operation is performed for the second external request WRITE(4), the first stage operation is performed for the third external request READ(2) such that the first buffer 1110 is allocated to wait for storage of data D(2)'.

In FIG. 10D, a third stage operation is performed for the second external request WRITE(4) such that the first control unit 1120 generates an internal command for writing the data D(3)' into the NAND flash memory device 1200 through the FTL operation.

While the third stage operation is performed for the second external request WRITE(4), the second stage operation is performed for the third external request READ(2). Here, since Hit is 1, the data D(2)' stored in the second buffer 1140 is transferred to the first buffer 1110 and then provided to the interface 1300. Accordingly, a process for the third external request READ(2) is completed.

At the same time of performing the above third and second stage operations on the second external request WRITE(4) and the third external request READ(2), respectively, the first stage operation is performed for the fourth external request READ(5) such that the first buffer 1110 is allocated to wait for storage of data D(5)'.

In FIG. 10E, a fourth stage operation is performed for the second external request WRITE(4) such that the data D(3)' of the first buffer 1110 is stored in the NAND flash memory device 1200.

At this time, in the pipeline register for the third external request READ(2), the Valid field is set to 0 to indicate that the process for the third external request READ(2) was completed. Accordingly, another request may be allocated to the corresponding pipeline register, i.e., the third pipeline register.

While the fourth stage operation is performed for the second external request WRITE(4), the second stage operation is performed for the fourth external request READ(5). Here, since Hit is 0 as shown in the first pipeline register, the procedure proceeds to the next stage without performing any operations.

In FIG. 10F, the Valid field of the pipeline register for the second external request WRITE(4) is set to 0 to indicate that the process for the external request WRITE(4) was completed.

At this time, the third stage operation is performed for the fourth external request READ(5) such that the first control unit 1120 performs the FTL operation to generate an internal command for writing the data D(5)' into the NAND flash memory device 1200.

In FIG. 10G, the fourth stage operation is performed for the fourth external request READ(5). Then, the data of the NAND flash memory device 1200 is stored in the first buffer 1110, and the data stored in the first buffer 1110 is provided to the interface 1300 to complete the process for the external request READ(5).

Although not illustrated, the Valid field of the pipeline register for the fourth external request READ(5) is set to 0, the corresponding register, i.e., the first pipeline register, may be allocated to another external request in subsequent stage operations.

So far, the various embodiments of the data I/O controller and the system including the same have been described with reference to the drawings. The system according to the embodiments of the present invention may be implemented in the form of an SSD, but may be implemented as a part of a computer system such as a laptop computer, PDA, desktop computer, or server computer, or a communication system such as communication equipment or a smart phone. Therefore, the system according to the embodiments of the present invention may include any of the above-described systems.

Furthermore, the semiconductor memory device that operates together with the data I/O controller according to the embodiments of the present invention may include any of volatile and nonvolatile semiconductor memory devices. However, when the semiconductor memory device is used as a large-capacity secondary memory device, a nonvolatile memory device may be applied as the semiconductor memory device. Furthermore, the nonvolatile memory device is not limited to a flash memory device, but may include any nonvolatile memory device such as an MRAM, PRAM, or ReRAM device.

According to the embodiments of the present invention, it is possible to provide the controller capable of processing a plurality of requests including read and write requests at the same time according to the pipeline scheme, thereby improving the data I/O processing speed.

Although various embodiments have been described for illustrative purposes, it will be apparent to those skilled in the art that various changes and modifications may be made without departing from the spirit and scope of the invention as defined in the following claims.

What is claimed is:

1. A controller that controls data input/output (I/O) for a semiconductor memory device, the controller comprising:
   a first buffer configured to perform data transmission between an interface and the semiconductor memory device at a first pipeline stage of a plurality of pipeline stages, wherein a first external request occupies the first pipeline stage;
   a second buffer configured to transmit and receive data to and from the first buffer;
   a first control unit configured to generate an internal command corresponding to a second external request to read data from the semiconductor memory device or to write data into the semiconductor memory device at a second pipeline stage of the plurality of pipeline stages, wherein the second external request occupies the second pipeline stage;
   a pipeline register unit configured to store information on processing states of the first external request and information on processing states of the second external request; and
   a second control unit configured to control the first buffer to perform the data transmission corresponding to the first external request at said first pipeline stage and to control the first control unit to generate the internal command at said second pipeline stage, by referring to the information on the processing states of the first and second external requests stored in the pipeline register unit,
   wherein the second and first external requests are sequentially input to the controller,
   wherein external requests flow from the first pipeline stage to the second pipeline stage,
   wherein the second control unit controls said first pipeline stage to perform the data transmission and said second pipeline stage to generate the internal command at the same time, and
   wherein, when the second control unit is configured to sequentially perform the plurality of pipeline stages for a certain external request among the external requests including the first and second external requests, the plurality of pipeline stages for the certain external request further comprises a third pipeline stage,
   at the first pipeline stage for the certain external request, the first buffer is allocated according to the certain external request,
   at the second pipeline stage for the certain external request, it is determined whether or not data of an address corresponding to the certain external request exists in the second buffer and data transmission is performed between the first and second buffers if the data of the address corresponding to the certain external request is determined to exist in the second buffer, and
   at the third pipeline stage for the certain external request, data transmission is performed between the semiconductor memory device and the first buffer according to the certain external request if the data of the address corresponding to the certain external request is determined not to exist in the second buffer.

2. The controller of claim 1, wherein the semiconductor memory device comprises a nonvolatile memory device.

3. The controller of claim 2, wherein the semiconductor memory device comprises a flash memory device, and the first control unit is configured to perform a flash translation layer (FTL) operation to generate the internal command.

4. The controller of claim 1, wherein, if the certain external request is a data write request,
   data from the interface is stored in the first buffer at the first pipeline stage,
   if the data of the address corresponding to the certain external request exists in the second buffer, the data stored in the first buffer is stored in the second buffer at the second pipeline stage, and
   if the data of the address corresponding to the certain external request does not exist in the second buffer, data previously stored in the second buffer is exchanged with the data stored in the first buffer at the second pipeline stage and then the data stored in the first buffer is written in the semiconductor memory device according to the certain external request at the third pipeline stage.

5. The controller of claim 1, wherein, if the certain external request is a data read request,
   data previously stored in the second buffer is stored in the first buffer and then provided to the interface at the second pipeline stage, and
   data of the semiconductor memory device is stored in the first buffer and then provided to the interface according to the certain external request at the third pipeline stage if the data of the address corresponding to the certain external request does not exist in the second buffer.

6. The controller of claim 1, wherein the third pipeline stage comprises:
   a $3\text{-}1^{st}$ stage at which the first control unit generates the internal command if the data of the address corresponding to the certain external request is determined not to exist in the second buffer; and
   a $3\text{-}2^{nd}$ stage at which the data transmission is performed between the semiconductor memory device and the first buffer according to the internal command.

7. The controller of claim 6, wherein, if the certain external request is a data write request,
   data from the interface is stored in the first buffer at the first pipeline stage,
   the data stored in the first buffer is transferred to the second buffer at the second pipeline stage if the data of the address corresponding to the certain external request exists in the second buffer, and data previously stored in the second buffer is exchanged with the data stored in the first buffer at the second pipeline stage and then the data stored in the first buffer is written in the semiconductor memory device according to the internal command at the 3-$2^{nd}$ stage if the data of the address corresponding to the certain external request does not exist in the second buffer.

8. The controller of claim 6, wherein, if the certain external request is a data read request, data previously stored in the second buffer is stored in the first buffer and then provided to the interface at the second pipeline stage if the data of the address corresponding to the certain external request exists in the second buffer, and data of the semiconductor memory device is stored in the first buffer and then provided to the interface according to the internal command at the 3-$2^{nd}$ stage if the data of the address corresponding to the certain external request does not exist in the second buffer.

9. A system comprising:
a semiconductor memory device; and
a controller configured to control data input/output for the semiconductor memory device,
wherein the controller comprises:
  a first buffer configured to perform data transmission between an interface and the semiconductor memory device at a first pipeline stage of a plurality of pipeline stages, wherein a first external request occupies the first pipeline stage;
  a second buffer configured to transmit and receive data to and from the first buffer;
  a first control unit configured to generate an internal command corresponding to a second external request to read data from the semiconductor memory device or to write data into the semiconductor memory device at a second pipeline stage of the plurality of pipeline stages, wherein the second external request occupies the second pipeline stage;
  a pipeline register unit configured to store information on processing states of the first external request and information on processing states of the second external request; and
  a second control unit configured to control the first buffer to perform the data transmission corresponding to the first external request at said first pipeline stage and to control the first control unit to generate the internal command at said second pipeline stage, by referring to the information on the processing states of the first and second external requests stored in the pipeline register unit,
wherein the second and first external requests are sequentially input to the controller,
wherein external requests flow from the first pipeline stage to the second pipeline stage,
wherein the second control unit controls said first pipeline stage to perform the data transmission and said second pipeline stage to generate the internal command at the same time, and
wherein, when the second control unit is configured to sequentially perform the plurality of pipeline stages for a certain external request among the external requests including the first and second external requests, the plurality of pipeline stages for the certain external request further comprises a third pipeline stage,
at the first pipeline stage for the certain external request, the first buffer is allocated according to the certain external request,
at the second pipeline stage for the certain external request, it is determined whether or not data of an address corresponding to the certain external request exists in the second buffer and data transmission is performed between the first and second buffers if the data of the address corresponding to the certain external request is determined to exist in the second buffer, and
at the third pipeline stage for the certain external request, data transmission is performed between the semiconductor memory device and the first buffer according to the certain external request if the data of the address corresponding to the certain external request is determined not to exist in the second buffer.

10. The system of claim 9, wherein the third pipeline stage comprises:
  a 3-$1^{st}$ stage at which the first control unit generates the internal command if the data of the address corresponding to the certain external request is determined not to exist in the second buffer; and
  a 3-$2^{nd}$ stage at which the data transmission is performed between the semiconductor memory device and the first buffer according to the internal command.

11. The system of claim 10, wherein the second buffer includes a cache memory having a higher processing speed than the semiconductor memory device.

* * * * *